(12) United States Patent
Wechsler

(10) Patent No.: US 7,500,765 B2
(45) Date of Patent: Mar. 10, 2009

(54) LIGHT FIXTURE AND LIGHTING METHOD

(76) Inventor: Lawrence I. Wechsler, One Wooleys La., Great Neck, NY (US) 11023

( * ) Notice: Subject to any disclaimer, the term of this patent is extended or adjusted under 35 U.S.C. 154(b) by 123 days.

(21) Appl. No.: 11/325,271

(22) Filed: Jan. 3, 2006

(65) Prior Publication Data
US 2006/0198152 A1 Sep. 7, 2006

Related U.S. Application Data

(60) Provisional application No. 60/641,243, filed on Jan. 3, 2005.

(51) Int. Cl.
*F21V 19/02* (2006.01)
*A01K 1/03* (2006.01)
(52) U.S. Cl. .................. 362/285; 362/228; 362/375; 362/400; 119/452
(58) Field of Classification Search ............. 362/228, 362/285, 375, 400; 119/452
See application file for complete search history.

(56) References Cited

U.S. PATENT DOCUMENTS

| | | | | |
|---|---|---|---|---|
| 4,180,850 A | * | 12/1979 | Bivens | 362/285 |
| 4,538,217 A | * | 8/1985 | Ewing et al. | 362/375 |
| 5,099,405 A | * | 3/1992 | Gehly et al. | 362/400 |
| 5,174,648 A | * | 12/1992 | Clary et al. | 362/228 |
| 5,247,901 A | * | 9/1993 | Landon et al. | 119/419 |
| 7,174,851 B2 | * | 2/2007 | Bonner et al. | 119/452 |
| 7,249,571 B2 | * | 7/2007 | Allis | 119/261 |

* cited by examiner

*Primary Examiner*—Sandra O'Shea
*Assistant Examiner*—James W Cranson

(57) ABSTRACT

A light fixture allows individual light bulbs to be arranged in compact fashion to maximize the number of bulbs per given area in the fixture. To facilitate replacement or exchange of the bulbs, the bulbs are mounted in alternating succession on a pair of separately movable supports, reorientation of which serves to remove the bulbs from the tight packed arrangement, to one in which the bulbs are sufficiently separated from one another to allow hand access for removal and installation of the bulbs. A distinct aspect of the aforementioned feature of the invention independent of the movable supports resides in the ability to utilize two of more of the fixtures to multiply the light produced. Advantageously, the fixtures can be arranged in direct physical series, side by side, or to form an array extending in orthogonal directions.

20 Claims, 6 Drawing Sheets

LIGHT FIXTURE AND LIGHTING METHOD

CROSS REFERENCE TO RELATED APPLICATIONS

This application claims the benefit of U.S. Provisional Application No. 60/641,243 filed Jan. 3, 2005 entitled LIGHT FIXTURE AND LIGHTING METHOD.

BACKGROUND OF THE INVENTION

The present invention relates to a light fixture, and more particularly to a light fixture suited for use in size-restricted areas, such as for example in lighting an aquarium or a plant bench, and which can provide light of greater intensity than many conventional fixtures, including a standard linear fluorescent fixture, and a method of providing lighting.

Many types of light fixtures are available for providing artificial light in connection with a number of diverse activities. These conventionally use various types of light sources, including incandescent, fluorescent, metal halide and sodium lamps. Each of these light sources have particular advantage and disadvantage, and selection of a particular type is dependent in large part on the desired application. For example, incandescent bulbs can be dimmed, but are the least light efficient, generating greater heat and less light per watt consumed than the remaining type lamps. Metal halide and sodium lamps require a ballast to operate. Magnetic ballasts, which can generate noise, are generally required, at present, for larger output bulbs. Fluorescent bulbs, while having greater efficiency than incandescent bulbs, cannot be dimmed.

Often, the level of light and spectral range emitted is the factor of greatest importance to a user. Particularly in the fields of aquaria and horticulture, wherein photosynthetic processes are involved, selection of a type of light is predicated upon production of sufficient levels of light intensity within a usable spectrum. While fluorescent lights, which are readily available and relatively inexpensive to buy and operate, and which output light in a spectral range usable in photosynthesis, they have heretofore not generally provided a sufficient level of light required by many plants and simulated reef environments. For this reason, metal halide lighting, while much more expensive that fluorescent lighting, is generally the lighting of choice for many applications requiring high intensity light.

Compact fluorescent bulbs are available, which are intended for replacement of less efficient incandescent bulbs, and which have an integral ballast and, optionally, a standard screw base. These bulbs can, according to present design, emit up to about four times the amount of light than a standard incandescent bulb using the same power, and therefore, because of their greater light efficiency, run much cooler while outputting comparable levels of light of other types of lighting sources. However, a light fixture for housing these lights has heretofore not delivered a suitable intensity of light for many applications.

It would therefore be desirable to provide a light fixture that could utilize any light source, including fluorescent, in a manner which increases the light provided thereby.

Accordingly, it is an object of the invention to provide a light fixture which overcomes the drawbacks of the prior art.

It is a further object of the invention to provide a light fixture in a compact size suitable for use in defined spaces, and which would maximize light density.

It is an additional object to provide a light fixture in a form that is economical and functionally versatile.

It is still a further object of the invention to provide a light fixture in which light elements can be installed easily for exchange or replacement, and which optionally accepts compact fluorescent bulbs having a standard incandescent type screw base.

It is yet a further object of the invention to provide a method of replacement or exchange of light bulbs in a fixture.

SUMMARY OF THE INVENTION

In accordance with these and other objects of the invention, there is provided a light fixture in which individual light bulbs are arranged in compact fashion to maximize the number of bulbs per given area in the fixture. The lights are movable from a use orientation to another, bulb replacement position in which the bulbs are accessible for hand replacement.

Briefly stated, a light fixture includes at least one support to which light bulbs or other light sources are mountably receivable. When installed to the support, the lights are energizable from a power source to emit light in a desired direction, for example, downward, when in a use orientation. The support is movable from the use orientation to a service orientation in which the bulbs are hand-accessible for replacement or substitution by a user. Advantageously, the support is supportably mounted to a suitable retaining structure in both orientations, and more advantageously continuously remains supportably mounted to the retaining structure also while moved between the respective orientations.

According to an embodiment of the invention, a light support is pivotably mountable to a supporting structure, provided, for example, in the form of a housing, and which is conveniently adapted for mounted support to a retaining structure. The light support with lights installed is suitably oriented in one retained position to the supporting structure for active use in providing light, i.e., a use orientation, and is rotatable from such use orientation to a service orientation while remaining mounted to the supporting structure. The lights may be simply arranged along a single row or, alternatively, plural rows, with all of the lights of a given row being disposed codirectionally. Alternatively, and more advantageously, individual lights can be arranged in a row, the lights being directed along respective mutually parallel planes running crosswise the row of lights, adjacent ones of the lights being positioned at an angle to one another, whereby such angularly offset arrangement provides greater accessibility to the lights for facilitated hand replacement notwithstanding a laterally close arrangement.

In accordance with another embodiment of the invention, in order to facilitate replacement or exchange of the bulbs, while concomitantly conveniently allowing the bulbs to be placed in a tightly-packed arrangement when in use, the individual bulbs are mounted in alternating succession on a pair of supports, at least one of which is movable independently of the other, reorientation of which serves to remove the bulbs from the tight packed arrangement, to one in which the bulbs on the respective supports are sufficiently separated from one another to allow facilitated hand access for removal and installation of the bulbs.

In accordance with an embodiment of the invention, a light fixture conveniently employs a pair of optional access panels, advantageously, though not necessarily, provided in the form of hinged doors, located more advantageously in an upward facing position of the fixture when oriented for use in emitting light in a downward direction, to allow access to the bulbs from above, rather than below, as in most, if not all, enclosed conventional fixtures designed to project light downwardly. The light bulbs (also referred to interchangeably herein as "light elements") are mounted to inwardly facing sides of respective ones of the doors, such that when the doors are opened upwardly (or panels removed, when not hingably mounted), each door (or panel) includes at least one of the bulbs mounted thereto, and which are made accessible by such movement. After replacement or exchange, the doors are returned to the closed position, thereby restoring an advantageously, but not necessarily, closely packed bulb arrangement, and preventing excessive upward escape of light.

In a particularly advantageous embodiment, a fixture in accordance with the invention utilizes self-contained, high efficiency output, compact fluorescent lights of the conventional type mentioned above, and which each have their own integral ballast, located generally between a base adapted for screw connection to a socket and the light emitting portion thereof. The bulbs are arranged with bases of alternate bulbs facing in a horizontal direction, or having a horizontal vector when arranged in a vertically tilted orientation, opposed to that of an adjacent bulb. A pair of supports, advantageously embodying at least one door, is provided at a top of the fixture Each bulb facing in one of the directions is mounted to one of the supports, and each bulb facing in the opposite direction is mounted to a remaining one of the supports, such that the bulbs are arranged in alternating fashion between one another, and extend in a sideways direction of the light fixture when supports are oriented in a use position.

Whether or not equipped with an access from above to bulbs contained in the fixture, as hereinbefore described, a distinct feature of the invention, providing independent advantage from the features mentioned above, includes an optional configuration allowing use of the fixtures as plural light emitting sources. Such feature has particular advantage in use, for example, in applications requiring greater light intensity over an extended defined region of given area, such as in connection with aquariums, terrariums, hydroponics and agriculture. Additionally, use of plural (two or more) fixtures allows selection of different bulbs for each fixture to suit, perhaps, different needs over different regions illuminated thereby. In a particularly advantageous embodiment, the light fixtures optionally include electrical coupling structure for transmitting power from one fixture to another connected therewith, thereby allowing multiple fixtures to be connected one to the other, and requiring only one to be powered directly to an external power outlet.

While virtually any light source can be used in the above described arrangements, use of compact fluorescent light elements is considered particularly advantageous, since each light can be selected to emit a desired spectrum of light for a given application. Additionally, since each light has its own ballast, the fixture is light weight, maintenance-free, and lights of different wattage can be freely substituted without requiring a change in ballast, as would be otherwise required in a fixture utilizing standard fluorescent bulbs.

The above, and other objects, features and advantages of the present invention will become apparent from the following description read in conjunction with the accompanying drawings.

DETAILED DESCRIPTION OF THE PREFERRED EMBODIMENT

Figure 1A:
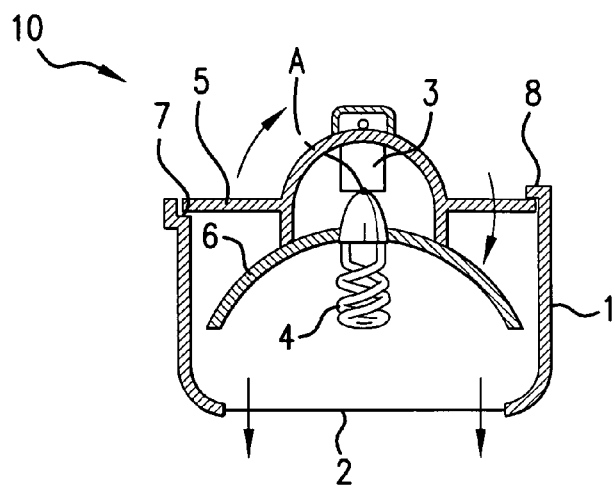
FIG. 1a is a cross-sectional view taken along line 1a-1a of FIG. 2 of a light fixture according to an embodiment of the invention, depicted in a use orientation.
Figure 1B:
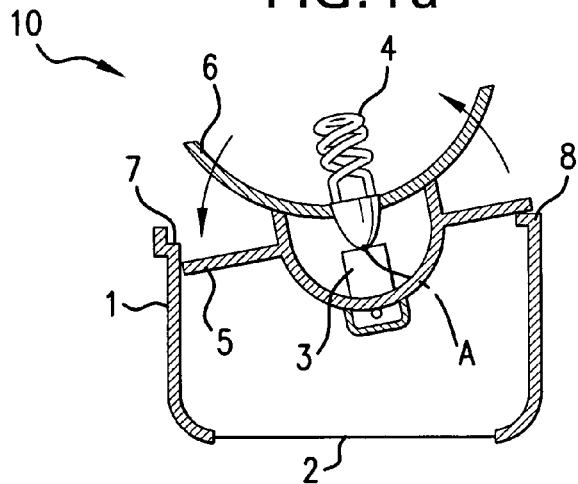
FIG. 1b is a cross-sectional view of the embodiment of FIG. 1a, depicted in a service orientation.
Figure 2:
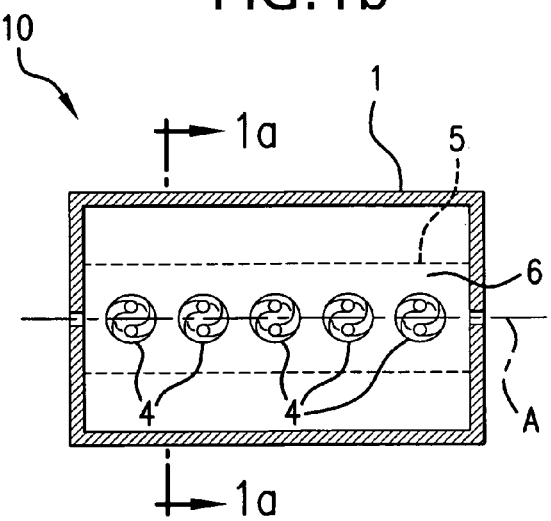
FIG. 2 is a bottom plan view of the embodiment of FIGS. 1a and 1b depicted in the use orientation.

Referring now to the figures, and in particular FIGS. 1a, 1b and 2, a light fixture in accordance with an embodiment of the invention is shown, generally at 10. Light fixture 10 includes a housing 1, and which optionally includes a light transmissive panel 2 through which light is directed generally in the direction of the arrows shown in FIG. 1a. Light sockets 3 for receiving light elements 4 are mounted to a rotatable support 5 that is pivotably received to the housing 1 for rotatable positional reorientation about a pivot axis A. A reflector 6 is advantageously provided to focus or increase the intensity of light directed in the desired direction, and as appropriately indicated by the desired application. It is noted that details of internal wiring within fixture 1, as well as external powering of the fixture 1, are omitted from the figures for simplifying illustration, and as being deemed unnecessary since the electrical configurations to be employed are well within the purview of one of ordinary skill in the art.

FIGS. 1a and 1b depict, respectively, a use orientation and service orientation. In particular, as shown in FIG. 1a (and FIG. 2), the light elements 4 are vertically positioned for light emission in a downward direction. When the light elements 4 require replacement, or alternatively, exchange of the light elements 4 is desired, for example, to alter a spectral output, the rotatable support is rotated about pivot axis A to the service orientation shown in FIG. 1b. In this position, the light elements 4 are exposed above the housing 1 and can be readily accessed by the user. When servicing is complete, the rotatable support 5 is pivoted back to the use position of FIG. 1a.

Advantageously, suitable structure is optionally provided that allows retained positioning in two discrete orientations corresponding respectively to the aforementioned use and service orientations. In the depicted example, shown essentially in simplified schematic form, this feature is provided conveniently in the form of a rest 7 and a stop 8 which engage edges of the rotatable support 5 to prevent rotation thereof past a roughly 180 degrees range of travel.

Figure 3:
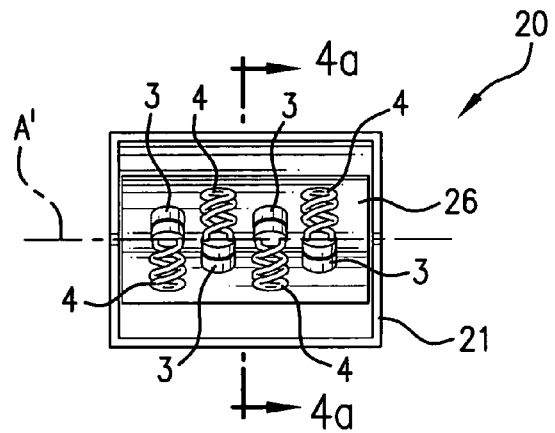
FIG. 3 is a bottom plan view of another embodiment of the invention depicted in a use orientation.
Figure 4A:
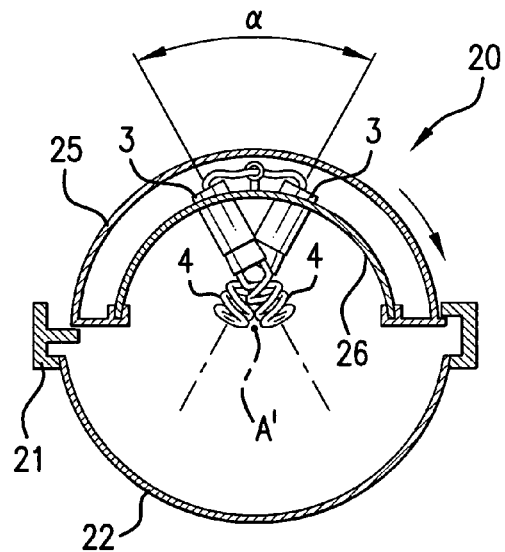
FIG. 4a is a cross-sectional view taken along line 4a-4a of FIG. 3 in the use orientation.
Figure 4B:
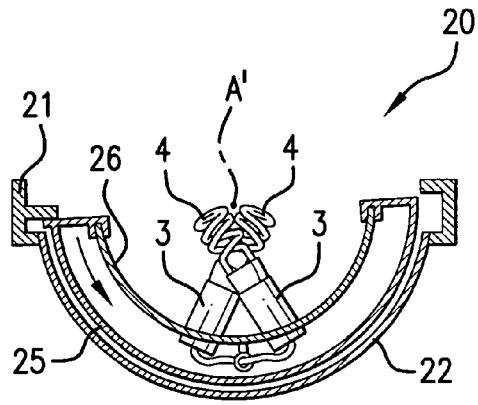
FIG. 4b is a cross-sectional view of the embodiment of FIG. 4a depicted in the service orientation.

Referring now to FIGS. 3, 4a and 4b, another embodiment of a light fixture is depicted generally at 20. While having a different shape than the previous embodiment, the overall functioning of the present embodiment is analogous with that of FIGS. 1a, 1b and 2. Light fixture 20 includes a housing 21, which also optionally includes a light transmissive window 22 which, while having a curved, rather than planar, configuration, corresponds in function and advantage to panel 2 of the previous embodiment. Light sockets 3 for receiving light elements 4 are mounted to a rotatable support 25 that is pivotably received to the housing 21 for rotatable positional reorientation about a pivot axis A'. A reflector 26 is also optionally and advantageously provided.

FIGS. 4a and 4b depict, respectively, a use orientation and service orientation, the further description of which is omitted as duplicative of the analogous description relating to the functioning of the previous embodiment of FIGS. 1a, 1b and 2. However, it is noted that the embodiment differs in the fact that light sockets 3 are mounted in an alternating angularly offset manner such that adjacent light elements are tilted at an angle α with respect to one another. Such feature further facilitates access to individual light elements 4 during servicing.

Turning now to FIGS. 5-8, a light fixture in accordance with another embodiment of the invention is shown, generally designated 30. Light fixture 30 includes a housing 31, and which optionally includes a light transmissive panel 32 through which light is directed generally in the direction of the arrows shown in FIG. 6a. Light sockets 3 for receiving light elements 4 are mounted to a pair of supports that are engageable with the housing 31 in a suitable manner as to allow reorientation with respect to, or removal from, the housing 31 to allow installation or substitution of the light elements 4, as will be explained below. While the arrows indicative of light rays transmitted through light transmissive panel 32 are shown as being parallel in FIG. 6a, it will be understood that the beam of light alternatively can be divergent or convergent depending on the nature (curvature) of a reflector 36 disposed behind the light bulbs.

Figure 5:
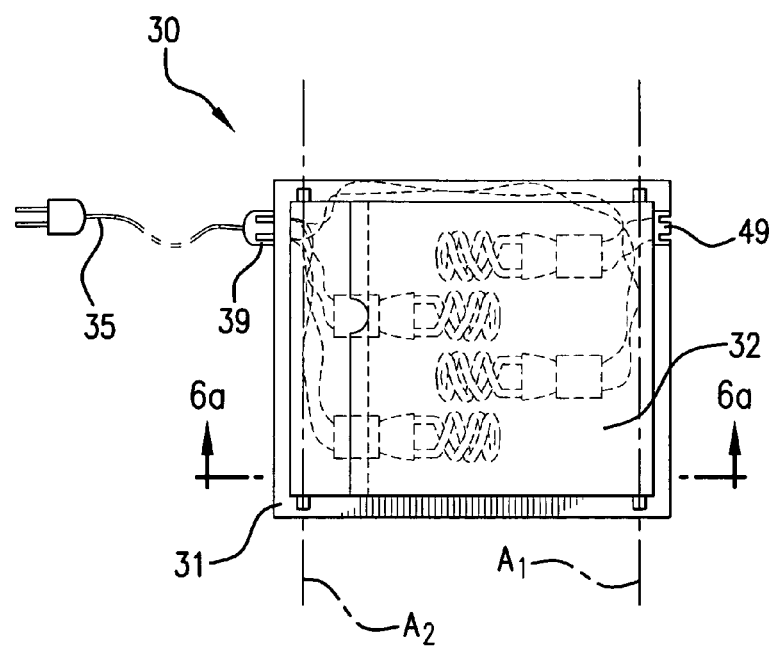
FIG. 5 is a top plan view of another embodiment of a light fixture in accordance with the invention.
Figures 6A, 6B:
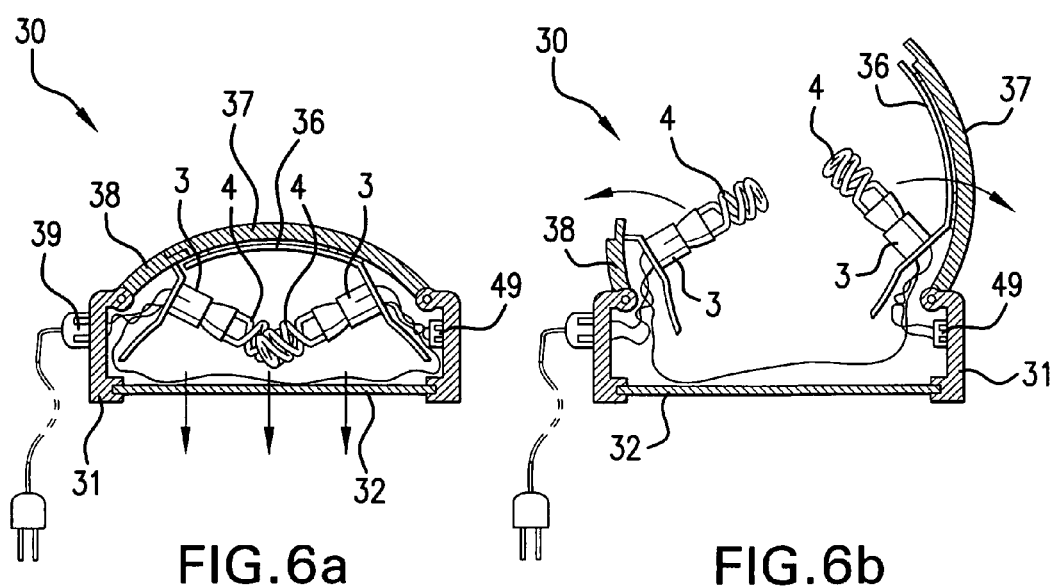
FIG. 6a is a cross-sectional view taken along line 6a-6a in FIG. 5.
FIG. 6b is a cross-section view taken along line 6b-6b in FIG. 7b.
Figure 8:
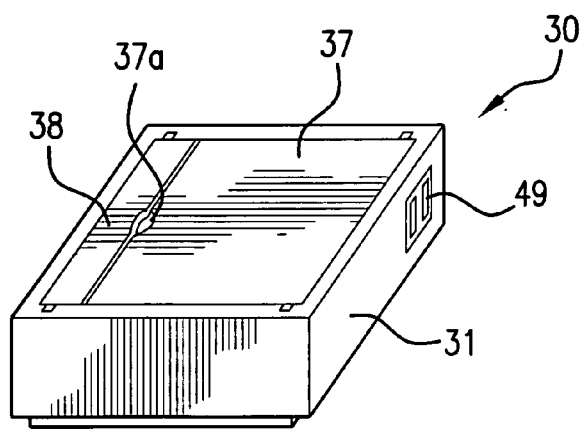
FIG. 8 is a perspective view of the light fixtures shown in FIGS. 5-7b, depicted with the access doors closed to a use oriented position.

The aforementioned supports for receiving the light elements 4 are provided in the present embodiment conveniently in the form of a first door 35 and a second door 36, both hingably mounted to the housing 31 to allow pivotable movement about respective axes $A_1$ and $A_2$. The reflector 36 is conveniently mounted to first door 37. The second door 38 is mounted inward of the first door 37 such that first door 37 partially overlaps the second door 38 when the light fixture 30 is closed, in the use position, as shown in FIGS. 5, 6a and 8. When installed, light elements 4 advantageously extend codirectionally with a width direction of the fixture 10, i.e. orthogonal to a direction of light emission from the fixture, or, as shown in FIGS. 6a and 6b, at a slight tilt from a horizontal plane, to minimize a required height of the fixture 10. The light elements 4 can, however, be oriented in any suitable orientation if height is not a particular issue, for example vertically, with bases of the light elements 4 facing opposite to the direction light transmitted from the light fixture 30. In the depicted example, four sockets 3 are provided for receiving up to four light elements 4, wherein two of the sockets 3 are mounted to the first door 37 and the remaining two of the sockets are mounted to the second door 38. It will be understood, however, that any number of sockets 3 and light elements 4 (odd or even) can be installed to a light fixture 30 of suitable length.

In the depicted embodiment of FIGS. 5-8, the light elements 4 are arranged with bases of alternate light elements 4 facing in a direction roughly opposed to that of an adjacent one of the light elements 4. However, the direction of the light elements 4 need not be reversed with each successive light element, i.e., every other light element, but instead, for example, could be reversed every two light elements, i.e. alternating pairs, or a combination of either pattern or other patterns.

As mentioned above, the second door 38 is mounted inward of the first door 37 such that the latter advantageously overlays a portion of the second door 38 when the light fixture 30 is in a closed, light illuminating orientation, as shown in FIGS. 5, 6a and 8. Therefore, while the first door 37 in the outer position can be a full panel, the second door must be suitably configured to provide suitable clearance to allow the sockets 3 carried on the first door 37 (and light elements 4 installed therein), to be received between the other light elements 4 and sockets 3 carried on the second door 38.

Figure 7A:
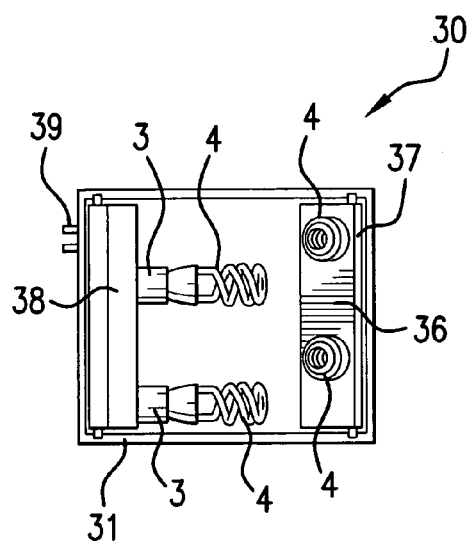
FIG. 7a is plan view of the light fixture of FIG. 5, shown with one of a pair of access doors moved to a bulb replacement position.
Figure 7B:
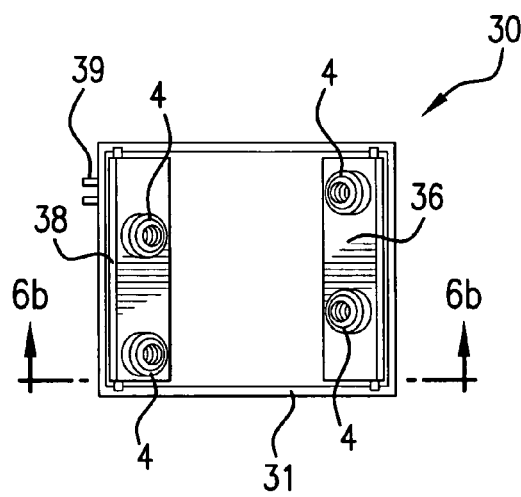
FIG. 7b is plan view of the light fixture of FIG. 7a, shown with both doors moved to respective bulb replacement positions.

When the light elements 4 are to be replaced, the first and second doors 36, 37 are opened as shown in FIGS. 6b and 7b. The intermediary step of initially opening the first door 37 is shown in 7a. When the light elements 4 have been replaced, the light fixture 30 is returned to a closed, use position (FIGS. 5, 6a and 8) by reversing the above steps. To further facilitate opening of the first door 37, a finger cutout 37a can optionally be provided as shown in FIG. 8.

Power is supplied to the fixture 30 by a power cord 35. A particularly advantageous option is to provide the power cord as a removable (cheater) cord which couples to a male plug 39 external of the fixture 30. The advantage of such feature will be apparent from the description which follows pertaining to a further embodiment.

Whether or not equipped with an access from above to bulbs contained in the fixture, as hereinbefore described, a distinct feature of the invention providing independent advantage from those pertaining to placement and reorientation of the light elements in a fixture is directed to an optional configuration allowing use of the fixtures as plural light emitting sources. Such feature has particular advantage in use, for example, in applications requiring greater light intensity over an extended defined region of given area, such as in connection with aquariums, terrariums, hydroponics and agriculture.

Figure 9:
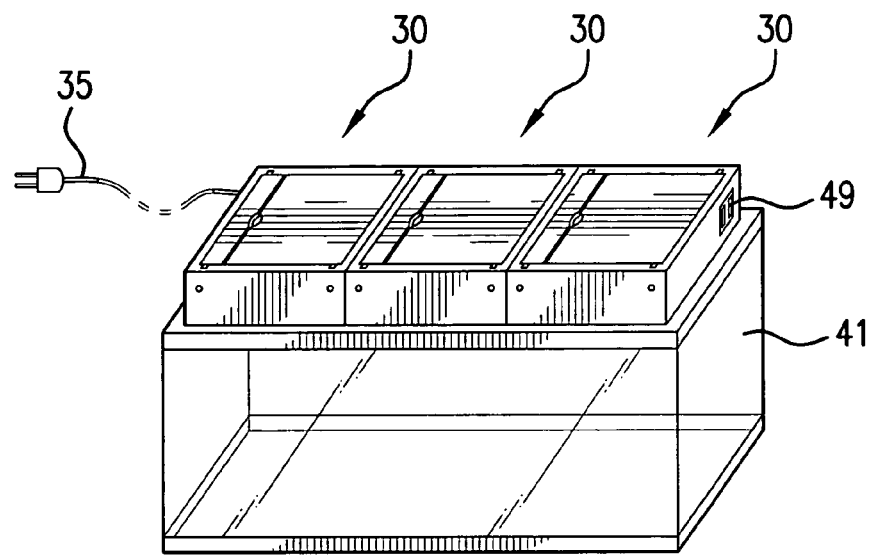
FIG. 9 is a perspective view depicting an embodiment employing a series of light fixtures according to the invention used atop an aquarium.

An example of such plural arrangement is depicted, for example in FIG. 9, and in which a plurality of light fixtures 30 of the general design as shown in FIGS. 5-8 are placed in adjacent positions atop an aquarium 41. Unlike standard fixtures of conventional design which are dimensioned to extend along a longitudinal direction of an aquarium tank, and which are generally supported by resting engagement of opposed ends of the fixture with the top edge of either side end of the aquarium, the feature of the present invention instead provides a dimension of the fixtures 30 which allows the fixtures to extend front to back of the aquarium 41, wherein the fixtures are supported on the top edges corresponding to the front and back walls of the aquarium. Suitable dimensioning of the fixtures 30 will advantageously allow a length extent of the aquarium to be subdivided into an appropriate number of fixtures, the latter which can then be placed atop the aquarium 41 to collectively extend over a substantial length portion of the aquarium, for example, as depicted in FIG. 9.

In a particularly advantageous variation, the light fixtures 30 of FIG. 9 optionally include electrical coupling structure for transmitting power from one fixture to another connected therewith, thereby allowing fixtures to be connected one to the other, and requiring only one to be powered directly to an external power outlet. As previously mentioned in connection with FIGS. 5-8, power is advantageously supplied to the fixture 30 by a power cord 35 which removably couples to a male plug 39 external of the fixture 30. Referring back to FIGS. 4-8, and as best seen in FIGS. 5 and 8, fixture 30 further includes a female connecter 49 positioned such that it aligns with male plug 39 of an adjacent fixture 30 when power cord 35 is removed. Such feature allows the following operation of adjacently abutted fixtures 30, as shown in FIG. 9. When the leftmost fixture 30 of FIG. 9 is powered by power cord 35, power is transferred to the female connector on the opposite side of the fixture 30 (the position of which is seen in the rightmost fixture 30 which is identical in construction) by suitable internal wiring (not shown). The aligned male plug 39 of the middle fixture 30 plugs into the female connector 49 of the leftmost fixture 30, and the male plug 39 of the rightmost fixture 30 in turn plugs into the female connector of the middle fixture. Power is therefore transferred from fixture to adjacent fixture, obviating the need for individual power cords for each of the plurality of fixtures.

Figure 10:
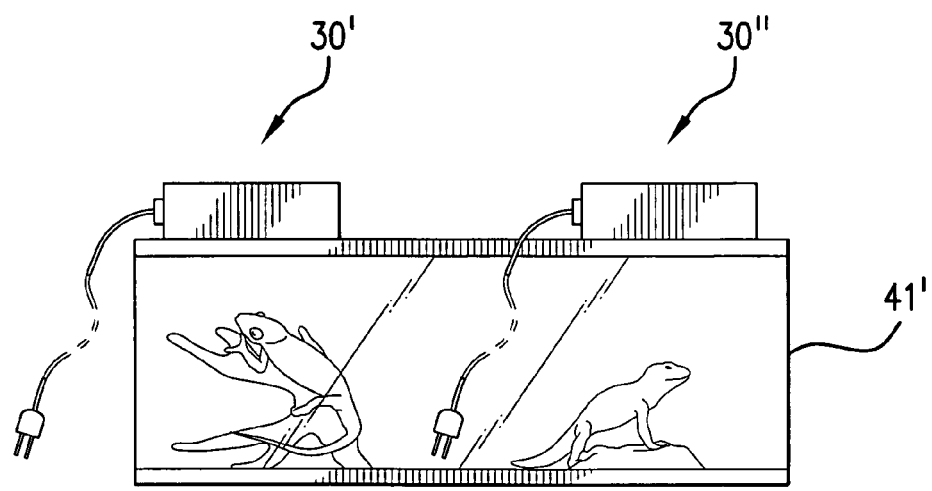
FIG. 10 is a front elevational view of another embodiment employing plural light fixtures according to the invention for use in lighting a reptile terrarium.

In addition to the above advantages associated with a modular arrangement of two or more fixtures, use of plural (two or more) fixtures allows selection of different bulbs for each fixture to suit different light requirements over different regions illuminated thereby. For example, as shown in the embodiment of FIG. 10, two light fixtures 30' and 30" received atop a terrarium enclosure 41' have different light elements (not shown) installed therein selected to emit light of the type desired to meet environmental light requirements for reptile husbandry. In the depicted example, light fixture 30' contains light elements designed to emit light in the ultraviolet range for basking animals in order to meet metabolic requirements for vitamin D production, and light fixture 30" is equipped with heat lamps to selectively create a temperature gradient along a longitudinal extent of the terrarium enclosure 41' to aid digestion when the reptile is under the light fixture 30" by raising body temperature.

It is noted that a light fixture within the broad embrace of the contemplated invention can be designed to accommodate virtually any type of light having any size or configuration. For example, while the above embodiments are directed to light elements of compact shape and having a standard screw base, the invention can be also practiced in a fixture adapted for use with linear fluorescent tubes. In such instance, the individual tubes would be mounted on separate supports, at least one of the supports being movable with respect to the remaining support such that the tubes could be placed side by side with minimal space therebetween during use, and reoriented to a service orientation in which the tight packed arrangement of the light tubes on the respective supports would be relieved.

While, as noted above, virtually any light source can be used in the above described arrangements, use of compact fluorescent light elements is considered particularly advantageous, since each light can be selected to emit a desired spectrum of light for a given application. Additionally, since each light has its own ballast, the fixture is relatively light weight, virtually maintenance-free and permits lights of different wattage to be freely substituted without requiring a change in ballast, as would be otherwise required in a fixture utilizing standard fluorescent bulbs.

Figure 11A:
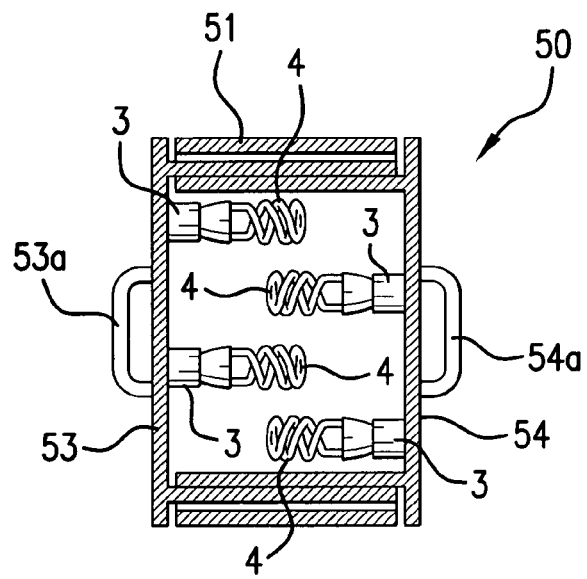
FIG. 11a is a plan view of another embodiment of a light fixture in accordance with the invention shown in condition of operation.
Figure 11B:
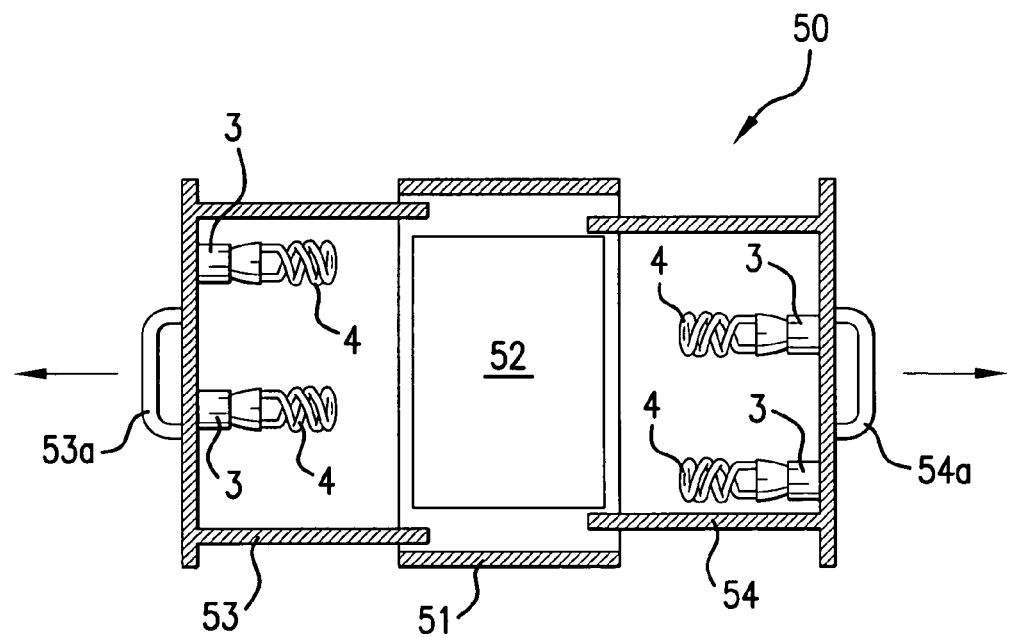
FIG. 11b is a plan view of the embodiment of FIG. 11a depicted in an opened condition for servicing of the light elements.

Furthermore, while the above-described embodiments each involves some form of pivotable movement of a light element receiving support relative to a housing, any type of movement can be employed without departure from the invention. For example, as shown in FIGS. 11a and 11b, a light fixture is depicted, generally designated 50, in which slidable movement is employed.

As depicted, light fixture 50 includes a housing 51 having an optional light transmissive panel 52, and a pair of slidably movable supports provided in the form of drawers 53 and 54 to which light sockets 3 are mounted for receiving light elements 4. FIGS. 11a and 11b show, respectively, use and service orientations. As shown in FIG. 11b, by moving drawers 53, 54 in opposed directions indicated by the arrows, light elements 4 are brought out of a tight packed arrangement, from the use orientation of FIG. 11a, and exposed from the housing for hand replacement in the service orientation, in analogous fashion with the other embodiments described herein. Handles 53a, 54a are optionally provided to facilitate movement of the drawers 53, 54.

It is noted that, in accordance with an advantageous embodiment of the invention, the light elements are optionally exposed to a region of the housing other than that corresponding the light transmissive panel, thereby obviating removal of the panel, and allowing the panel to be readily sealed in a waterproof or water resistant fashion to the housing. Such feature provides particular advantage when used for gardening and aquarium applications, where water presents a potential threat to the internal workings of the fixture.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A light fixture, comprising:
   a housing including at least one light transmissive portion through which light produced at an interior of the housing is transmittable from said interior to an exterior of the housing in at least one illumination direction;
   at least one support movable with respect to said housing and which allows selective placement of said at least one support in a use orientation and a service orientation; and
   powerable light sockets mounted to said at least one movable support for receiving light elements which, when received thereto, are positioned to emit light through said at least one light transmissive portion when said at least one support is in said use orientation, said light elements being hand accessible from an access direction different from said at least one illumination direction for removal and replacement of said light elements when said at least one support is in said service orientation.

2. A light fixture according to claim 1, wherein said at least one support is hingably mounted to said housing.

3. A light fixture according to claim 2, wherein said housing includes a pair of hingable doors disposed opposite to said at least one light transmissive portion with said light sockets being disposed therebetween, at least one of said at least one support being mounted to each of said doors.

4. A light fixture according to claim 1, wherein said at least one light transmissive portion includes at least one area comprised of a light transmissive material through which said light is directed to said exterior.

5. A light fixture according to claim 4, wherein said light transmissive material includes at least one window sealed in a waterproof or water resistant manner to the housing.

6. A light fixture according to claim 1, wherein said light elements include at least one compact fluorescent bulb.

7. A light fixture according to claim 1, wherein said at least one support includes a pair of supports arranged such that when said light elements are received thereto, ones of said light elements on one of said pair of supports directionally oppose other ones of said light elements on an other of said pair of supports.

8. A light fixture according to claim 7, wherein said ones of said light elements are in positions offset from said other ones of said light elements.

9. A light fixture according to claim 7, wherein said ones of said light elements are angularly offset from said other ones of said light elements.

10. A light fixture according to claim 7, wherein bases of said ones of said light elements face in a generally opposite direction form other bases of said other ones of said light elements.

11. A light fixture according to claim 7, wherein said ones of said light elements and said other ones of said light elements extend past a common central axis.

12. A light fixture according to claim 1, wherein said at least one support is slidably mounted to said housing.

13. A method of providing light, comprising:
   arranging light elements in a desired pattern for emitting light in at least one illumination direction while said light elements are located in a first orientation; and
   rearranging the light elements in a second orientation by movement of the lights in a servicing direction different from said at lest one illumination direction, said light elements being accessible by a hand of a user for removal and replacement thereof by other light elements when in said second orientation.

14. A method according to claim 13, further comprising returning said other light elements to the first orientation.

15. An animal enclosure in combination with at least one light fixture, said combination comprising:
   the animal enclosure having a width and a length each of given dimensions, and a vertically extending periphery defining front and back upper edges defining said width therebetween, said length being greater than said width;
   the at least one light fixture being be supportably receivable on said front and back upper edges or structure carried thereon to extend therebetween in a width direction of said animal enclosure, a length of said fixture being less than said length of said animal enclosure whereby said light fixture cannot entirely span said length of said enclosure.

16. An animal enclosure in combination with at least one light fixture according to claim 15, wherein said length of said animal enclosure is at least twice said width of said at least one light fixture thereby permitting at least two of said at least one light fixture to be accommodatable along the length of said animal enclosure.

17. An animal enclosure in combination with at least one light fixture according to claim 15, wherein at least one light fixture includes electrical coupling structure for cooperatively transmitting power from one of said least one light fixture to another of said at least one light fixture.

18. An animal enclosure in combination with at least one light fixture according to claim 15, wherein said one of said least one light fixture is suppliable with power by a removable cord connectable with an input portion of said electrical coupling structure.

19. An animal enclosure in combination with at least one light fixture according to claim 17, wherein said electrical coupling structure for cooperatively transmitting power from one of said at least one light fixture to another of said at least one light fixture includes male and female plugs carried on each of said least one light fixture.

20. An animal enclosure in combination with at least one light fixture according to claim 15, wherein said at least one light fixture includes at least two light fixtures each accommodating at least one different type bulb from one another to suit different light requirements.

* * * * *